Sept. 16, 1952 W. H. CHURCHILL 2,610,375
MOLDING FASTENER
Filed Jan. 21, 1947
Fig. 1.
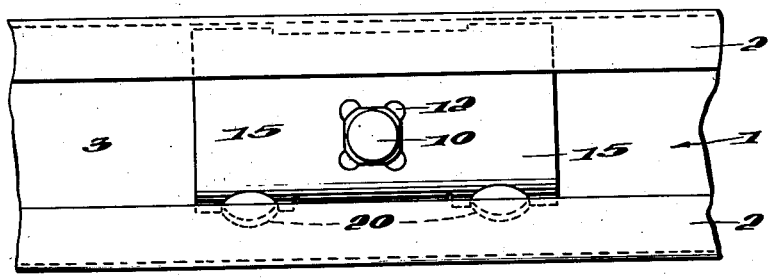
Fig. 2.
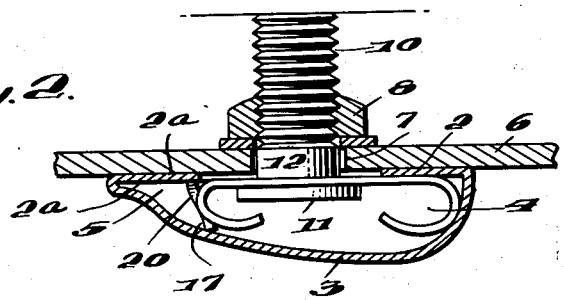
Fig. 4.
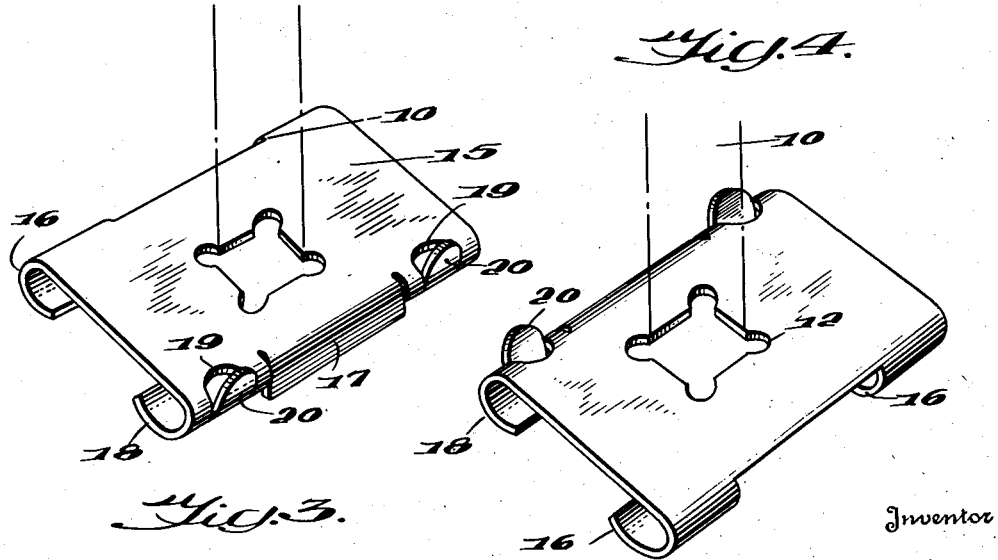
Fig. 3.
Inventor
WILMER H. CHURCHILL,
By John Todd
Attorney Patented Sept. 16, 1952

2,610,375

UNITED STATES PATENT OFFICE 2,610,375

MOLDING FASTENER

Wilmer H. Churchill, Saugus, Mass., assignor to United-Carr Fastener Corporation, Cambridge, Mass., a corporation of Massachusetts Application January 21, 1947, Serial No. 723,247

1 Claim. (Cl. 24—73)

The present invention relates to molding fasteners such as are employed for attaching a channel-shaped molding to an apertured support, and particularly to fasteners of the T-bolt type, and aims generally to improve existing fasteners of that type.

One of the primary objects of the invention is the provision of an improved molding fastener adaptable for mounting upon a support a molding of irregular cross section and varying channel depth while maintaining the shank of the T-bolt substantially midway between the opposed molding edges.

A further object of the invention is the provision of an improved molding fastener of the T-bolt type that may be inserted with an irregularly shaped channel of a molding in tensioned engagement with the inner faces of opposite flanges and slid therealong to a predetermined position in the molding for attachment to an apertured support.

Other aims and objects of the invention will be apparent to persons skilled in the art to which the invention relates, from a consideration of the accompanying drawings and annexed description illustrating and describing a preferred embodiment of the invention.

In the drawings

Fig. 1 is an inner face elevation of a molding strip illustrating a fastener of the invention positioned therein;

Fig. 2 is a transverse sectional view of the molding and fastener as taken on the line 2—2 of Fig. 1;

Fig. 3 is a detail perspective view of the fastener as viewed from one side thereof; and Fig. 4 is a detail perspective view of the fastener as viewed from the opposite side illustrated in Fig. 3.

Referring to the drawings, the fastener of the present invention is designed for use particularly with a channel-shaped molding 1 having opposed inturned flanges 2—2ª in the inner face thereof and an irregularly shaped wall 3 on the front face thereof, the irregularly shaped or contoured wall presenting opposed channels 4 and 5 of different depths under opposite flanges 2 and 2ª, respectively. As will be readily understood in the art the molding is adapted to be fixedly attached to a support 6 apertured at 7, as by a bolt and nut fastening 8, as is customary, and preferably the bolt portion of the fastening 8 is a part of the fastener member hereinafter described.

As herein illustrated, the fastener of the present invention is of the T-bolt type having a threaded shank 10 provided with an enlarged head 11 at one end, a portion of the shank adjacent the head 11 being squared or polygonal shaped to non-rotatably receive the fastener head 15.

The head 15 of the fastener is advantageously formed of a single piece of thin sheet metal, for example, carbon steel, which may be suitably shaped and then hardened, as by heat-treating, to provide adequate strength combined with lightness in weight.

The fastener head 15 preferably comprises a body portion of suitable length and width for the particular size of molding to be employed, and preferably the body portion is of elongated rectangular form provided, along at least one side edge, with a downwardly and inwardly rolled flange 16 of suitable depth, adapted for face contact with the inner surface of the wall 3 and along an opposite edge with a down-turned substantially right angularly disposed flange 17 adapted for edge contact with the inner face of the wall 3. The rolled edge 16 may be of continuous length or of spaced sections as illustrated in Fig. 4, and the angularly disposed flange 17 is preferably of less length than the head 15 and disposed between spaced rolled edge portions 18 of similar shape to, but opposing the rolled edge 16. The rolled edge 16 is adapted to be fitted in the deepest side channel 4 of an irregularly shaped molding (see Fig. 2) and to make face contact with the under face of the adjoining flange 2 and the inner face of the wall 3.

The angularly disposed flange 17 is advantageously deeper than the rolled edge 16 and is adapted to make edge contact with the inner face of the molding wall 3. If the distance between the inner face of the flange 2ª and the wall 3 at the shallowest channel is less than the depth of the flange 17, said flange may be bent inwardly so that the head is supported in the molding by face engagement of the rolled portions 18 with the wall 3.

A fastener head of the above described type, when positioned in an irregularly shaped molding such as shown in Fig. 2, will usually not be positioned centrally of the molding. In such cases the rolled edge 16 will be positioned in the deeper channel 4 and well under the adjacent flange 2 for face-bearing engagement with the molding wall 3 outwardly of the free edge of the flange 2. The opposite side edge of the head 15, from which extends the flange 17 and rolled edge portions 18, may be disposed substantially in the transverse plane of the inner edge of the flange 2ª or even slightly inwardly thereof. In such cases contact between the head 15 and the inner face of the flange 2ª is effected by edge portions 19 disposed substantially in the plane of the outer face of the head 15 at the outer terminal ends of outwardly bent tongues 20 which may be cut from the body of the metal providing the rolled edge portions 18 of the illustrated embodiment. The flange 17 and the tongues 20 provide camming surfaces for receiving an edge of the molding flange and guiding it to a fastened position with the edge portions 19.

The shank portion 10 of the fastener is connected to the head and is disposed in a plane normal thereto, and preferably is located at a position eccentrically of the head, as shown, so as to be disposed centrally of the molding 1. The attachment of the shank 10 to the head may be effected in any convenient manner, and where a headed bolt type of shank is employed, as illustrated, the head 15 may be provided with an eccentric square opening to receive the squared portion 12 of the shank, the latter better being upset over the head, as by swaging, to non-rotatably secure the head and shank together.

While I have described my invention with reference to one preferred embodiment thereof, as shown, I do not intend to be limited thereby, as the scope of the invention is best defined in the appended claim.

I claim:

A molding clip comprising an elongated sheet metal head member and a stud member extending substantially normal to one face of said head, a resilient molding-engaging portion extending from one side edge of said head and curving upwardly and inwardly to overlie an opposite face of said head, a flange extending from the opposite edge of said head providing an end portion disposed in a plane at an acute angle to said head, and an upwardly and inwardly curling portion extending from said opposite edge adjacent said flange and having a tongue cut therefrom disposed in the plane of said end portion of said flange and extending in a direction opposite thereto to provide an end edge disposed substantially in the plane of said one face of said head, said head providing a surface adjacent said one side edge for engaging the inner face of a molding flange and said molding-engaging portion providing an arcuate surface for engaging an inner surface of a molding adjacent said molding flange, said flange element and said tongue providing camming surfaces for receiving an edge of an opposite flange of such molding, said end edge of said tongue and the free end edge of said end portion of said flange being adapted to engage the inner face of said opposite flange and a substantially opposing portion of the inner face of said molding.

WILMER H. CHURCHILL.

REFERENCES CITED

The following references are of record in the file of this patent:

UNITED STATES PATENTS

| Number | Name | Date |
|---|---|---|
| 2,166,889 | Churchill | July 18, 1939 |
| 2,330,675 | Brown | Sept. 28, 1943 |
| 2,473,400 | Waara | June 14, 1949 |